United States Patent
Tidow et al.

(10) Patent No.: US 7,132,482 B2
(45) Date of Patent: Nov. 7, 2006

(54) METHOD FOR VULCANIZING CAOUTCHOUC OR LATEX BY APPLYING A MIXTURE OF SULFUR AND A COMPLEXING AGENT

(75) Inventors: Joern Tidow, Schwetzingen (DE); Herbert Scholz, Neustadt (DE); Fritz Nimtz, Leimen (DE); Michael Stang, Ludwigshafen (DE); Thomas Danner, Erpolzheim (DE); Adolf Parg, Bad Duerkheim (DE); Rolf Foerster, Neustadt/Wstr. (DE); Karl-Heinrich Schneider, Kleinkarlbach (DE); Hans-Josef Sterzel, Dannstadt-Schauernheim (DE); Bernhard Albert, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/518,592

(22) PCT Filed: Jun. 30, 2003

(86) PCT No.: PCT/EP03/06894

§ 371 (c)(1),
(2), (4) Date: Dec. 21, 2004

(87) PCT Pub. No.: WO2004/005386

PCT Pub. Date: Jan. 15, 2004

(65) Prior Publication Data

US 2005/0288448 A1    Dec. 29, 2005

(30) Foreign Application Priority Data

Jul. 8, 2002    (DE) ................ 102 30 801

(51) Int. Cl.
*C08C 19/20*    (2006.01)
*C08F 8/34*    (2006.01)
*C08L 97/00*    (2006.01)

(52) U.S. Cl. ............... 525/354; 525/343; 525/332.6; 525/331.9; 525/535; 525/539; 524/76; 524/72; 524/13; 524/14

(58) Field of Classification Search ............ 525/332.6, 525/343, 539; 524/72, 76, 158, 160
See application file for complete search history.

(56) References Cited

U.S. PATENT DOCUMENTS

| | | | | | |
|---|---|---|---|---|---|
| 1,783,216 | A | * | 12/1930 | Bogemann et al. | 525/332.5 |
| 2,028,482 | A | * | 1/1936 | Tucker | 516/96 |
| 2,195,827 | A | * | 4/1940 | Ryan | 524/517 |
| 2,201,124 | A | * | 5/1940 | Ehman et al. | 424/705 |
| 3,012,985 | A | | 12/1961 | Doonan et al. | |
| 3,704,283 | A | * | 11/1972 | Mayer-Muder et al. | 526/217 |
| 3,755,518 | A | * | 8/1973 | Fritz et al. | 264/45.3 |
| 5,308,500 | A | * | 5/1994 | Schwarzbach | 210/716 |
| 5,496,789 | A | * | 3/1996 | Weiss et al. | 502/339 |
| 5,599,373 | A | * | 2/1997 | Zanuccoli | 71/21 |
| 6,410,042 | B1 | * | 6/2002 | Schroeder et al. | 424/421 |

FOREIGN PATENT DOCUMENTS

| | | | |
|---|---|---|---|
| DE | 26 04 695 A1 | * | 3/1977 |
| DE | 286 343 A | | 1/1991 |
| FR | 77 38767 A | * | 7/1978 |
| GB | 826 161 A | | 12/1959 |
| GB | 1 396 757 A | | 6/1975 |
| JP | 62-52108 A | * | 3/1987 |
| WO | WO 99/04634 A1 | * | 2/1999 |

OTHER PUBLICATIONS

JP 62-52108 (abstract in English).*
DE 26 04 695 (abstract in English).*
FR 77 38767 (abstract in English).*
Ullmanns Encyklopädie der technischen Chemie, 4th Edition, vol. 13, Verlag Chemie Weinheim, New York 1977, pp. 639-640.
Ullmanns Encyklopädie der technischen Chemie, 3rd Edition, vol. 9, Urban & Schwarzenberg, Munich, Berlin 1957, p. 352.

* cited by examiner

*Primary Examiner*—David W. Wu
*Assistant Examiner*—Rip A. Lee
(74) *Attorney, Agent, or Firm*—Rothwell, Figg, Ernst & Manbeck pc

(57) ABSTRACT

The invention relates to a method for vulcanizing caoutchouc or latex by adding a mixture M which contains a component a) from a1) 20 to 96% by weight of sulfur, a2) 4 to 80% by weight of a complexing agent, and optionally other additives b) to caoutchouc or latex and then vulcanizing the mixture. The inventive method is characterized in that the average particle size of the primary particles of component a) ranges from 0.05 to 20 µm.

9 Claims, No Drawings

METHOD FOR VULCANIZING CAOUTCHOUC OR LATEX BY APPLYING A MIXTURE OF SULFUR AND A COMPLEXING AGENT

CROSS REFERENCE TO RELATED APPLICATION

This application is a 35 USC § 371 National Phase Entry Application from PCT/EP2003/006894, filed Jun. 30, 2003, and designating the U.S.

The present invention relates to a process for vulcanizing rubber or latex by adding a mixture M comprising a component a) made from a1) from 20 to 96% by weight of sulfur, a2) from 4 to 80% by weight of a complexer, and, where appropriate, comprising other additives b), and also to the use of a mixture M for vulcanizing rubber or latex, and also the vulcanized rubber or latex obtainable by the process of the invention.

The vulcanization of rubber or latex using elemental sulfur is known (Ullmanns Encyklopädie der technischen Chemie, 4th edition, volume 13, Verlag Chemie Weinheim, New York 1977, pp. 639–640 and Ullmanns Encyklopädie der technischen Chemie, 3rd edition, volume 9, Urban & Schwarzenberg, Munich, Berlin 1957, p. 352).

When vulcanizing rubber it is usual to use fine-particle pure sulfur which may also have been treated with dipersing agents (e.g. oils), or to use sulfur paste, the primary particle size in each case being about 45 μm.

When latex is vulcanized, use is usually made of a sulfur-containing dispersion which can be obtained by grinding sulfur with a dispersing agent (e.g. β-naphthalenesulfonic acid-formaldehyde condensate), achieving a primary particle size of about 45 μm.

For latex vulcanization using this sulfur it is also possible to use colloidal sulfur, which has a primary particle size of about 10 μm.

The usual procedure for the vulcanization process known per se for rubber or latex is that first the sulfur or the sulfur-containing mixture is converted by grinding to give the appropriate particle size and then, where appropriate together with other additives, such as vulcanization accelerators, etc. (see Ullmanns Encyklopädie der technischen Chemie, 4th edition, volume 13, Verlag Chemie Weinheim, New York 1977, p. 639 et seq.) added to the latex or rubber to be vulcanized, the vulcanization conditions, which are likewise known, then being set so that vulcanization takes place.

In all of these processes, uniform distribution of the sulfur is essential if the vulcanized rubber is to have a good property profile.

However, a disadvantage of the known prior-art sulfur comminution process is that sulfur has to be handled in a form which generates dust, or that sulfur dust is produced as a product of operations. Especially in view of explosion protection, this is a critical aspect of the vulcanization process. In addition, very fine-particle sulfur dusts can penetrate into the lungs and possibly cause risks to health, and therefore protection of health is another reason for the desirability of non-dusting sulfur preparations.

One way of eliminating the sulfur dust problem encountered by the user is the use of what is known as "polymer-bound" sulfur. However, a disadvantage of this is that it is not free-flowing and is therefore difficult to convey into the vulcanization systems. In addition, "polymer-bound" sulfur can be used for vulcanization only in rubber mixtures and not in latex, since its polymeric character prevents it from dissolving or dispersing in the aqueous latex mixture.

It is an object of the present invention, therefore, to develop a process which vulcanizes rubber or latex and in which the vulcanizing sulfur is present in a form such that it is distributed homogeneously in the rubber or latex but is practically non-dusting and therefore not difficult to handle, especially from the point of view of explosion protection.

We have found that this object is achieved by means of a process for vulcanizing rubber or latex by adding a mixture M comprising a component a) made from
a1) from 20 to 96% by weight of sulfur,
a2) from 4 to 80% by weight of a complexer, and, where appropriate, comprising other additives b), to the rubber or latex and then carrying out the vulcanization, which comprises using a component a) whose average primary particle size is in the range from 0.05 to 20 μm; the use of a mixture M—as defined in any of claims 1 to 6—as agent for vulcanizing rubber or latex, and vulcanized rubber or latex obtainable by the process as claimed in any of claims 1 to 6 have also been found.

The nature of the sulfur present in the mixture of the invention is not critical. It is possible to use any of the types of elemental sulfur which have been known for a long time and have been described in detail and are commercially marketed products.

An example of a highly suitable product is sulfur obtainable from natural gas purification plants.

The amount of the sulfur a1) in the component a) of the invention is in the range from 20 to 96% by weight, preferably from 70 to 95% by weight, and in particular from 75 to 85% by weight, based in each case on the total weight of component a).

Complexers a2) which may be used are non-polymeric complexer compounds, but preferably polymeric complexer compounds. The complexer a2) may comprise not only the pure complexer compounds but also any mixtures of the pure complexer compounds, in any desired mixing ratio.

The non-polymeric complexer compounds used may comprise EDTA (ethylenediaminetetraacetic acid), NTA (nitrilotriacetic acid), EDDHA (ethylenediaminedi(ortho-hydroxyphenyl)acetic acid), DTPA (diethylenetriaminepentaacetic acid), HEDTA (hydroxyethylenediaminetriacetic acid), preferably ethylenediaminetetraacetic acid and/or diethylenetriaminepentaacetic acid.

Polymeric complexer compounds which may be used comprise polyacrylic acid and its salts, in particular Na salts, polymethacrylic acid and its salts, in particular Na salts; polymaleic acid, for example prepared by hydrolyzing polymaleic anhydride, in particular Na salts; polyvinylpyrrolidone, copolymers made from acrylic acid and maleic acid, in particular Na salts, copolymers made from vinylpyrrolidone and vinyl acetate; graft copolymers made from vinylpyrrolidone and $C_{20}$ α-olefin; copolymers made from vinylpyrrolidone and acrylic acid; copolymers made from vinylpyrrolidone and dimethylaminoethyl acrylate; copolymers made from methyl vinyl ether and maleic anhydride (derivatives); copolymers made from styrene and maleic anhydride; polyaspartic acid and its salts; poly-p-vinylbenzenesulfonic acid and its salts; copolymers made from ethylene and/or propylene and/or isobutene and (meth) acrylic acid; modified starches; modified celluloses, e.g. carboxymethylcellulose; alginates; lignin derivatives, such as ligninsulfonates; chitosans; modified polysaccharides; phenolsulfonic acid-formaldehyde condensates; naphthalenesulfonic acid-formaldehyde condensates.

The polymeric complexer compounds a2) used preferably comprise ligninsulfonates; naphthalenesulfonic acid-formaldehyde condensates, polyacrylic acid and its salts, in particular Na salts; polymethacrylic acid and its salts, in particular Na salts; polymaleic acid or its salts, for example prepared by hydrolyzing polymaleic anhydride, in particular Na salts; copolymers made from acrylic acid and maleic acid, in particular Na salts; polyacrylates; polyaspartates and other polyamino acids. Particular polymeric complexer compounds used comprise ligninsulfonates and/or β-naphthalenesulfonic acid-formaldehyde condensates.

Ligninsulfonates are known and are described by way of example in Römpp Chemilexikon, 9th edition, volume 3, Georg-Thieme Verlag, Stuttgart, New York 1990, p. 2511. Ligninsulfonates which are very suitable are the alkali metal and/or alkaline earth metal salts and/or ammonium salts, for example the ammonium, sodium, potassium, calcium, or magnesium salts of ligninsulfonic acid. It is preferable to use the sodium, potassium, or calcium salts, very particularly the sodium and/or calcium salts.

The term ligninsulfonates also, of course, encompasses mixed salts of various ions, for example potassium/sodium ligninsulfonate, potassium/calcium ligninsulfonate, or the like, in particular sodium/calcium ligninsulfonate.

Naphthalenesulfonic acid-formaldehyde condensates are likewise known and are marketed, for example as Tamol® products from BASF Aktiengesellschaft.

The amount of the cation complexer a2) in the component a) of the invention is in the range from 4 to 80% by weight, preferably from 5 to 30% by weight, and in particular from 15 to 25% by weight, based in each case on the total weight of component a).

If the component a2) used comprises a mixture of ligninsulfonate and naphthalenesulfonic acid-formaldehyde condensate, the proportion of the ligninsulfonate in this mixture is usually in the range from 10 to 90% by weight and the proportion of the naphthalenesulfonic acid-formaldehyde condensate in this mixture is in the complementary range from 90 to 10% by weight.

Components a) of the invention which are particularly highly suitable are those made from 75 to 85% by weight of sulfur and from 15 to 25% by weight of ligninsulfonate.

Examples of components a) of the invention are: 95% by weight of sulfur+5% by weight of sodium ligninsulfonate; 90% by weight of sulfur+10% by weight of sodium ligninsulfonate; 80% by weight of sulfur+20% by weight of sodium ligninsulfonate; 75% by weight of sulfur+25% by weight of sodium ligninsulfonate; 95% by weight of sulfur+5% by weight of potassium ligninsulfonate; 90% by weight of sulfur+10% by weight of potassium ligninsulfonate; 80% by weight of sulfur+20% by weight of potassium ligninsulfonate; 95% by weight of sulfur+5% by weight of calcium ligninsulfonate; 90% by weight of sulfur+10% by weight of calcium ligninsulfonate; 80% by weight of sulfur+20% by weight of calcium ligninsulfonate; 75% by weight of sulfur+25% by weight of naphthalenesul-fonic acid-formaldehyde condensate; 80% by weight of sulfur+20% by weight of naphthalenesulfonic acid-formaldehyde condensate; 90% by weight of sulfur+10% by weight of naphthalenesulfonic acid-formaldehyde condensate; 95% by weight of sulfur+5% by weight of naphthalenesulfonic acid-formaldehyde condensate.

The mixture M of the invention or component a) may be prepared by mixing, comminuting, drying, for example spray drying. It is preferable to obtain component a) by spray drying.

The form in which the mixture M of the invention or component a) is present is generally, but preferably after spray drying, that of free-flowing microparticles whose average particle size—determined by the CIPAC MT 170 sieve analysis method (CIPAC Handbook F—p. 420—Dry Sieve Analysis of Waterdispersible Granules) is in the range from 50 μm to 4 mm, preferably in the range from 100 μm to 2 mm, the average diameter of their primary particles being in the range from 0.05 to 20 μm, preferably in the range from 0.1 to 15 μm, in particular in the range from 0.5 to 8 μm (determined by the ISO 13320-1: 1999 method (Particle Size Analysis—Laser Diffraction Methods)).

Besides component a), the mixture M of the invention may comprise other additives b).

Other additives b) which may be used in the mixture M are the conventional additives for sulfur vulcanization, e.g. ulcanization accelerators or vulcanization retarders, antioxidants, antifatigue agents, fillers, pigments, plasticizers, etc. Further details are found in Ullmanns Encyklopädie der technischen Chemie, 4th edition, volume 13, Verlag Chemie Weinheim, New York 1977, pp. 639 et seq.).

The mixture M of the invention may be used in the conventional usage forms for sulfur vulcanization mixtures (cf. the description given at the outset). The mixture M of the invention is usually used undiluted in the form of free-flowing, antistatic, waterdispersible microgranules, in aqueous dispersion, or else in the form of a paste, depending on whether solid rubber or liquid latex is to be vulcanized.

An advantage of the mixture M of the invention is that although it comprises very small primary particles it does not dust during the preparation of the vulcanization mixture or during its use, but nevertheless becomes homogeneously distributed in the latex or rubber to be vulcanized, and provides vulcanized rubber with good properties.

One particular merit of the mixture M of the invention is that it can be very effectively dispersed (suspended) in water, for example, i.e. the mixture of the invention does not settle within the aqueous dispersion (suspension) over reasonable periods, nor separates ("creams") on the surface, for example. A good measure of this dispersibility (suspendability) is what is known as the CIPAC MT 168 suspension stability (CIPAC Handbook F—p. 427—Determination of Suspension Stability of Waterdispersible Granules). The suspension stability of the aqueous dispersions (suspensions) which comprise the mixture M of the invention is usually from 50 to 100%, preferably from 70 to 100%.

EXAMPLES

Natural rubber was mixed with the sulfur mixture of the invention and other additives, and then vulcanized. The vulcanized rubber was then studied. During preparation of this sulfur/rubber mixture it was found that the free-flowing, dust-free sulfur mixture of the invention can be incorporated into the rubber mixture substantially more rapidly than conventional sulfur agents.

Good values are obtained (see table) for the mechanical properties of the vulcanisates from this mixture of the invention.

The low-dusting property of the sulfur mixture of the invention was measured using the Dust-View method from the company Pallas, Karlsruhe. For the mixture of the invention the value obtained was about 7, and in comparison a commercially available colloidal sulfur gave a value of 97 in the same test.

TABLE H 294

| | | [phr]¹⁾ |
|---|---|---|
| Test mixture: | | |
| NR CV 40 (Natural Rubber) | | 100 |
| Stearic acid | | 1 |
| IPPD antioxidant | | 0.75 |
| SDPA antioxidant | | 1 |
| N 330 carbon black | | 50 |
| Zinc oxide | | 8 |
| Sulfur, ground | | — |
| Coated ground sulfur (95%) | | — |
| Insoluble sulfur (80%) | | — |
| Polymer-bound sulfur (80%) | | — |
| Sulfur mixture of the invention (95% by weight of sulfur + 5% by weight of β-naphthalenesulfonic acid-formaldehyde condensate) | | 3.4 |
| CBS (vulcanization accelerator) | | 0.65 |
| Tests: | | |
| Mooney 100° | ML1' + 4' | 62.9 |
| t5 100° C. | min. | >60 |
| Rheometer 150° C. | t90 min. | 8.2 |
| Vulcanization: 15 minutes 150° C.; hot-air aging: 72 hours 100° C. | | |
| Shore A | unaged | 71 |
| | aged | 77 |
| Tensile strength | | |
| Unaged | Fmax N/mm² | 20.97 |
| Aged | Fmax N/mm² | 9.02 |
| Elongation at break | | |
| Unaged | % | 415.9 |
| Aged | % | 152.8 |

¹⁾parts per hundred rubber

The invention claimed is:

1. A mixture M suitable for vulcanizing rubber or latex comprising a component a) which comprises 20 to 96% by weight of sulfur and from 4 to 80% by weight of a complexer, said component a) having an average primary particle size in the range from 0.05 to 20 μm, wherein the mixture M is free-flowing with an average particle size of from 50 μm to 4 mm.

2. A sulfur-containing composition as claimed in claim 1, where the complexer comprises a polymeric complexer compound.

3. A sulfur-containing composition as claimed in claim 2, where the polymeric complexer is a ligninsulfonate, a β-naphthalenesulfonic acid-formaldehyde condensate, or a mixture of ligninsulfonate and β-naphthalenesulfonic acid-formaldehyde condensate.

4. A vulcanizable composition comprising rubber or latex and a vulcanizing amount of a mixture M which comprises component a) comprising
   a1) from 20 to 96% by weight of sulfur
   a2) from 4 to 80% by weight of a complexer, based on the total weight of component a), and wherein the average primary particle size of component a) is the range from 0.05 to 20 μm, wherein the mixture M is free-flowing with an average particle size of from 50 μm to 4 mm.

5. A process for vulcanizing rubber or latex comprising adding a mixture M comprising a component a) comprising
   a1) from 20 to 96% by weight of sulfur,
   a2) from 4 to 80% by weight of a complexer and where appropriate other additives b) to the rubber or latex and then conducting the vulcanization, wherein the average primary particle size of component a) is in the range from 0.05 to 20 μm, wherein the mixture M is free-flowing with an average particle size of from 50 μm to 4 mm.

6. A process as claimed in claim 5, wherein the complexer a2) comprises a polymeric complexer compound.

7. A process as claimed in claim 5, wherein the polymeric complexer a2) is a ligninsulfonate, a β-naphthalenesulfonic acid-formaldehyde condensate, or a mixture of ligninsulfonate and β-naphthalenesulfonic acid-formaldehyde condensate.

8. A process as claimed in claim 5, wherein the polymeric complexer a2) is an alkali metal ligninsulfonate and/or an alkaline earth metal ligninsulfonate.

9. A process as claimed in claim 5, wherein the mixture M is a liquid dispersion.

* * * * *